Sept. 1, 1959 R. M. BRINK ET AL 2,902,329

RANDOM ACCESS MEMORY APPARATUS

Filed May 22, 1953 3 Sheets-Sheet 1

INVENTORS.
ROBERT M. BRINK
BATTLE H. KLYCE
BY
Campbell, Brumbaugh, Free & Graves
THEIR ATTORNEYS.

Sept. 1, 1959 R. M. BRINK ET AL 2,902,329

RANDOM ACCESS MEMORY APPARATUS

Filed May 22, 1953 3 Sheets-Sheet 2

INVENTORS.
ROBERT M. BRINK
BATTLE H. KLYCE
BY
Campbell, Brumbaugh, Free & Graves
THEIR ATTORNEYS.

Sept. 1, 1959 R. M. BRINK ET AL 2,902,329

RANDOM ACCESS MEMORY APPARATUS

Filed May 22, 1953 3 Sheets-Sheet 3

INVENTORS.
ROBERT M. BRINK
BATTLE H. KLYCE
BY
Campbell, Brumbaugh, Free & Graves
THEIR ATTORNEYS.

United States Patent Office 2,902,329

Patented Sept. 1, 1959

2,902,329

RANDOM ACCESS MEMORY APPARATUS

Robert M. Brink, New Canaan, and Battle H. Klyce, Glenbrook, Conn., assignors to Time, Incorporated, New York, N.Y., a corporation of New York Application May 22, 1953, Serial No. 356,768

8 Claims. (Cl. 346—74)

This invention relates generally to information storage devices and, more particularly, to a random access information storage device adapted to contain a maximum number of intelligence items within a given area of information storage surface.

Well known devices in the prior art for storing information are of the type in which a member, such as a magnetic tape, receives from a signal transfer unit, such as a magnetic head, a number of separate intelligence items, the phrase "intelligence item" being used to indicate a collection of indicia representing pertinent facts about a common subject. These intelligence items may be stored over a period of time upon the magnetic tape surface for subsequent reconversion into electric signals by the magnetic head. In such type device, however, access to a given intelligence item is usually obtained by the single parameter method in which the entire length of the tape must be scanned until the desired item is located.

Where it is necessary to store a large number of intelligence items and speedy access must be had to the same, as, for example, in connection with circulation fulfillment problems of a magazine where it is necessary to maintain a large listing of subscribers and pertinent facts concerning the same, information storage devices of the single parameter type are unsatisfactory, because of inherent inability to locate a desired item with the required speed. Accordingly, to cope with such information storage problems, it is necessary to utilize a random access device in which the location of any item may be defined in terms of a plurality of parameters, and the device, by satisfying each of these parameters, locates the desired item within a short space of time.

In one form of random access signal storage device hitherto proposed, the information storage member comprises a number of signal storing ribbons stretched across a frame, each ribbon carrying information items and each ribbon being characterized as to location by a set of coordinates taken with respect to the frame. A random access device using information storage members of this sort, however, is subject to certain basic disadvantages. For example, in order to maintain the dimensional stability of the information stored on the ribbons, it is necessary either to maintain the ribbons under considerable tension, an undesirable feature, or to provide for some means for pulling the ribbons against the signal transfer device. Also, such assemblies of ribbons and frames are extremely expensive to fabricate.

It is, accordingly, an object of the invention to remedy the above noted deficiencies in the prior art.

Another object of the invention is to provide an information storage member in which a maximum number of information items may be impressed upon a unit area of storage surface.

A further object of the invention is to provide an information storage member of the above character in which both sides of the member may be utilized for information storage.

A further object of the invention is to provide a signal transfer unit adapted for direct engagement with the storage member to concentrate a maximum amount of information per unit length of storage surface traversed by the transfer unit.

A further object of the invention is to provide means for eliminating inaccuracies caused by improper relative positioning during scanning between the storage member and the signal transfer device.

A still further object of the invention is to provide a means for producing effective signal transfer by driving the signal transfer device over the storage member surface at a high speed.

For a better understanding of the invention, reference is made to the following detailed description of representative embodiments of the invention taken in conjunction with the accompanying drawings, in which.

Figure 1:
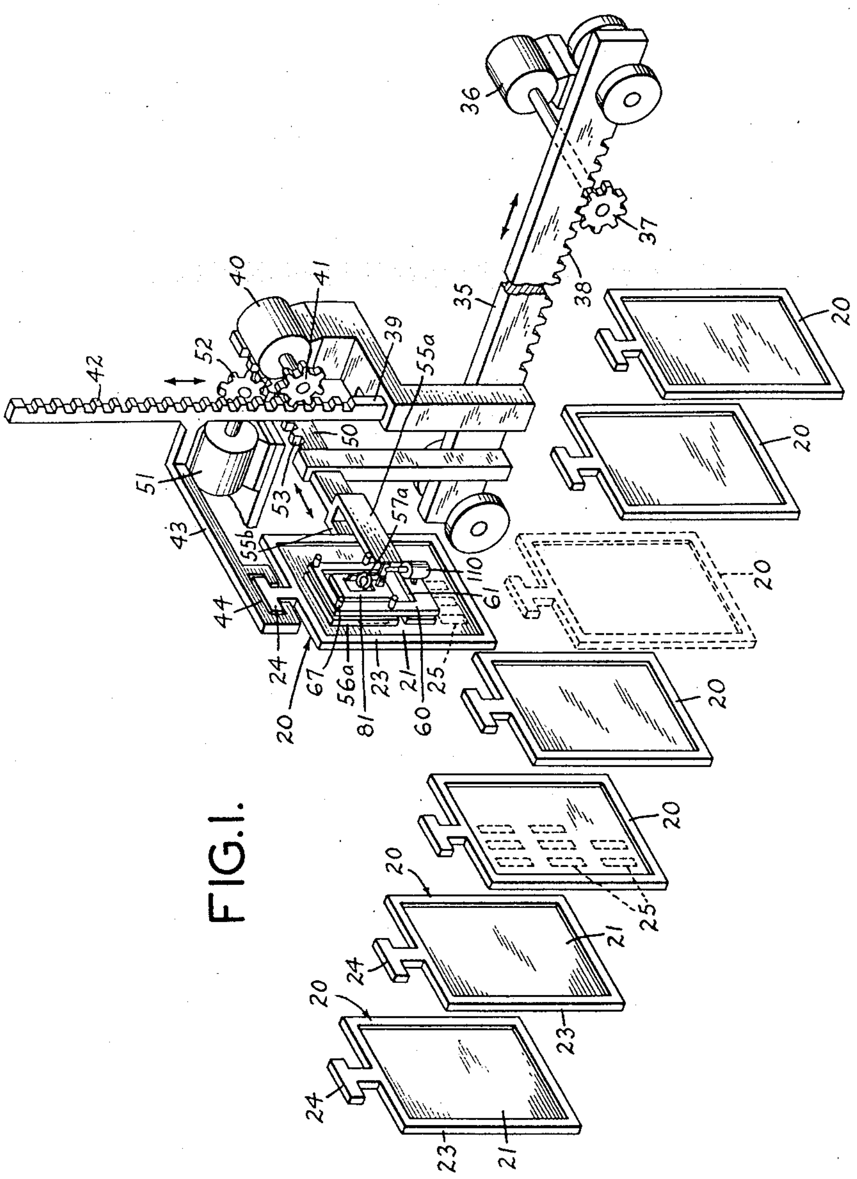
Figure 1 is a perspective drawing of a random access signal storage apparatus.

Referring now to Figure 1, the figure shows a number of horizontally stacked information storage members 20, hereinafter also referred to as information carriers, which, for convenience, are represented as being widely spaced apart, although in practice the carriers 20 may be spaced substantially contiguous with each other. Each of the carriers 20 in supported by conventional means (not shown) to be constrained from horizontal movement, but to be free to rise vertically from an initial base position.

Figures 2, 3:
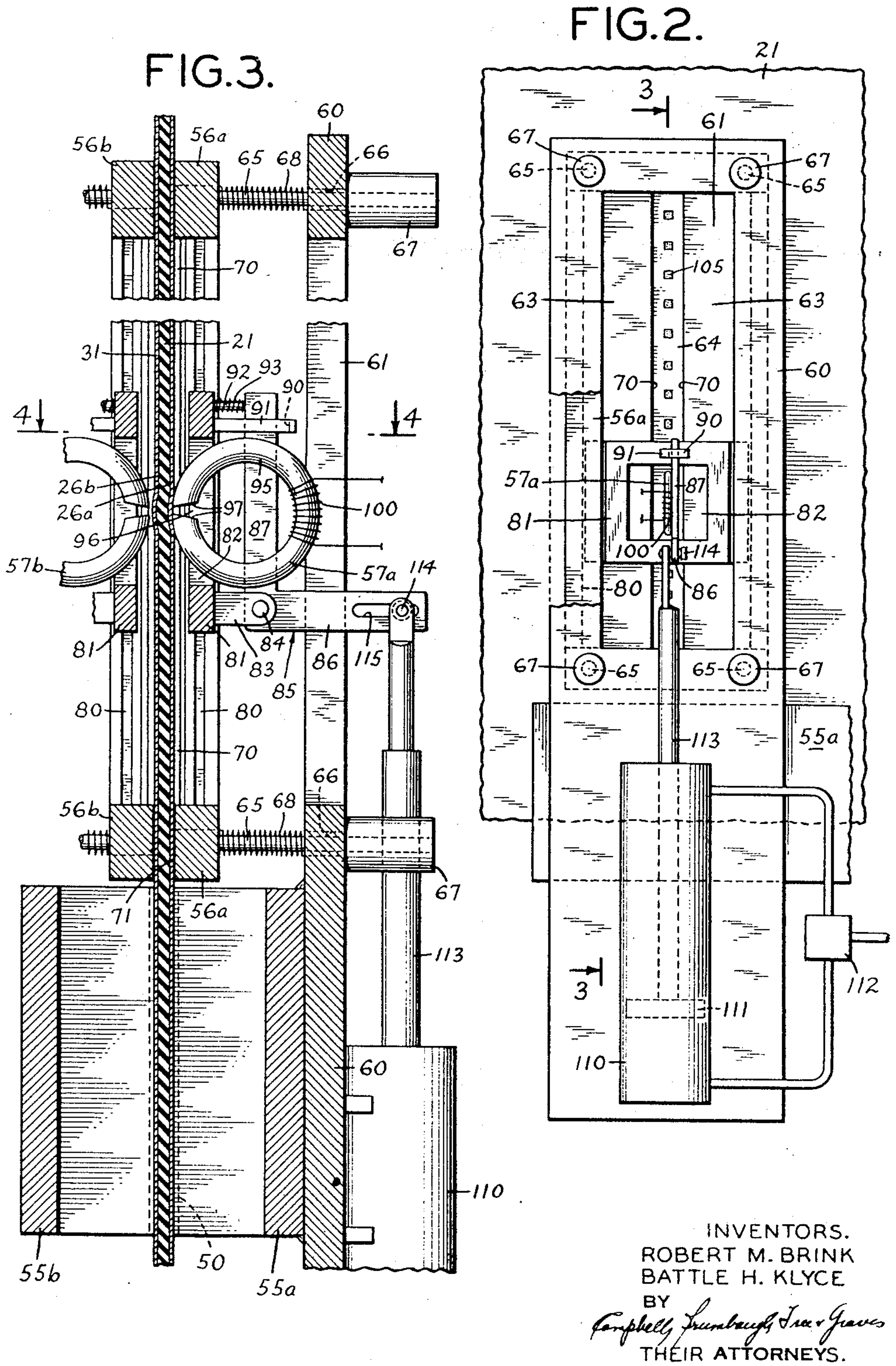
Figure 2 is a front elevation of the clamp-scan assembly shown in Figure 1.
Figure 3 is a sectional view taken in side elevation, as indicated by the arrows 3—3 of Fig. 2, of the clamp-scan assembly.

As to construction, each of the carriers 20 consists of a central sheet 21 of resilient material 22 (Fig. 11) which is edge supported by a frame 23, each frame 23 being surmounted by a T-shaped tab 24. In each carrier 20, the resilient sheet 21, while physically continuous in areal extent, may be geometrically subdivided into a number of discrete sections 25 of narrow horizontal but appreciable vertical, extent. The mentioned sections have apiece two face portions 26*a* and 26*b*, as shown in Figure 3, one on each side of the resilient sheet. Each face portion of a section may be thought of as representing a storage area for a single item of information. It will be appreciated, however, that, in practice, the information item storage areas on the two sides of sheet 21 need not necessarily be demarcated for registry between individual storage areas on opposing sides.

The resilient sheets 21 carry, either interspersed within the body of the resilient material comprising the same (Fig. 11) or adhering as a layer 30 upon the surface of sheets (Fig. 10) a quantity of material 31 which is adapted to store information signals. The material 31 used with the apparatus of Figure 1 is preferably of the magnetically sensitive type, as, for example, iron oxide, but may be any electromagnetic signal sensitive material, the phrase, "electromagnetic signal sensitive material," denoting any material which may be modified, either in a magnetic property or in a dielectric property, or otherwise, in order to store information signals.

It will be seen, therefore, that the stack of information carriers 20 is adapted to store a great number of separate intelligence items, one item to each of face portions 26a and 26b of a section 25 of a resilient sheet 21. The location of each particular intelligence item in the stack may be described in terms of a set of coordinates, as follows:

(*a*) The information carrier to which the item belongs;
(*b*) The vertical position on the carrier of the section of the desired item;
(*c*) The horizontal position on the carrier of the section of the item;
(*d*) The one of the two face portions of the indicated section which bears the item.

These various coordinates which fully determine the location of each separate intelligence item, may be represented by signals A, B, C and D, fed as inputs to the random access apparatus by means not shown, as, for example, by a manually operated keyboard, or by a device automatically actuated in response to indicia on a punched card, perforated tape, or the like. When a particular set of input signals A, B, C and D are fed to the random access apparatus, a reading cycle of operations is produced in the same to cause the particular intelligence item represented by this particular set of signals to be selected out of the stack and to be read.

To carry out this reading cycle, a carriage 35, normally loacted at a start position to the right, as shown in Figure 1, of the stack of storage members 20, is adapted to be moved back and forth along the stacking axis of the same by a motor 36. Motor 36 drives the carriage 35 through a pinion 37 which engages a rack 38 secured to the under-side of the carriage frame.

The carriage 35 carries a vertical rack bar 39 normally maintained in fully lowered position, but which is movable up and down in the vertical direction by a motor 40 which, through a pinion 41, drives a vertical rack 42 attached to the rack bar 39. The bar 39 carries a cross arm 43 extending horizontally in a line parallel to the plane of the information carriers 20 to a point over the center of these members. The cross arm 43 has formed in its remote end a T-shaped slot 44 of slightly larger dimensions than the T-shaped tabs 24 of the carriers 20. When the rack bar 39 is in its fully lowered position, the T-shaped slot 44 of the cross arm 43 is so disposed that, as the carriage 35 is moved past the stack of information carriers, the various T-shaped tabs 24 of the carriers will pass with clearance through the T-shaped slot 44 of the cross arm.

The carriage 35 also carries a horizontal rack bar 50, which is normally maintained in fully retracted position to the right, as seen in Figure 1, but which is movable back and forth in the horizontal direction by a motor 51 which, through a pinion 52, drives a rack 53 attached to the bar 50. The rack bar 50 is so disposed that its longitudinal axis lies parallel to and directly below the longitudinal axis of the cross arm 43.

The horizontal rack bar 50 carries at its left-hand end a pair of horizontal fork arms 55a and 55b extending towards the carriers 20, the two fork arms being spaced equidistantly on opposite sides of the longitudinal axis of the rack bar 50. These two fork arms 55a and 55b carry, respectively, at their remote extremities a pair of clamp-scan assemblies including, respectively, a pair of carrier clamps 56a and 56b (Fig. 3) which are adapted to cooperate together to grip the margins of the section 25 bearing the information item selected. The two clamps 56a and 56b carry, respectively, a pair of signal transfer units 57a, 57b (Fig. 3), a selected one of which, for a particular reading, is adapted to traverse a vertical path with respect to its clamp to read off from the corresponding face portion of the clamped section the information item stored thereon. The term, signal transfer unit, refers to a device, such as a magnetic head, adapted to produce, between an electric current and an information storage member, a transference of signals either in the nature of signal recording on the member or signal reproduction or both.

The reading cycle of the apparatus of Figure 1 to select and read an intelligence item, responsive to an input of a set of signals A, B, C and D, will now be considered. Initially, the carriage 35 is disposed, at a start position located sufficiently to the right, as shown in Figure 1, so that the T-shaped slot 44 of the cross arm 43 does not contain the T-shaped tab 24 of any information carrier 20. The vertical rack bar 39 is disposed in a fully lowered position while the horizontal rack bar 50 is retracted all the way to the right, as shown in Figure 1. At the start of a reading cycle, the motor 36 responsive to an input of signal A, moves the carriage 35 to the left to a position where the T-shaped slot 44 of the cross arm 43 encompasses the T-shaped tab 24 of the particular information carrier 20 indicated by signal A.

Upon selection of the information carrier as described, the motor 40 responsive to an input of signal B moves (through the pinion 41 and the rack 42) the vertical rack bar 39 from its fully lowered position upwards by an amount determined by signal B. The cross arm 43 which moves up with the bar 39 accordingly lifts the selected carrier 20 upward by means of a coupling between the T-shaped slot 44 of the cross arm and the T-shaped tab 24 of the carrier. The carrier is lifted an amount such that the section 25 bearing the information to be read is raised up to the level of the fork arms 55a and 55b.

Concurrently with the vertical positioning operation, the motor 51 (responsive to an input of signal C and by means of the pinion 52 and the rack 53) moves the horizontal rack bar 50 in extension to the left, the two fork arms 55a and 55b attached to the bar 50 passing on opposite sides of the selected carrier 20. The extension motion of the bar 50 ceases at a point indicated by signal C, at which point the clamps and signal transfer units carried by the fork arms are disposed opposite the section 25 bearing the selected intelligence item.

Thereafter, by a control system (not shown), as, for example, a relay system, the oppositely disposed clamps 56a and 56b are caused to move towards each other to grip, between the two, the margins of the section 25 bearing the selected intelligence item. A clamping of the carrier 20 in this manner provides a number of useful results, as will be later more fully described.

The section 25 which has been clamped carries, as stated, two intelligence items, one upon one face portion 26a of the section, and the other item upon the other face portion 26b. After completion of the clamping operation, an input of signal D actuates the drive mechanism for the signal transfer unit disposed opposite the selected one of the two intelligence items. Upon actuation of the drive mechanism, the selected signal transfer unit, with a rapid motion, traverses in a vertical direction the face portion bearing the intelligence item to be read. As a result of this rapid traverse or scan of the signal transfer unit, intelligence indicia stored in the selected face portion are converted into a sequence of electric signals which are fed to a utilization device (not shown). This utilization device may, for example, be a means for visually indicating information stored on the scanned face portion or a means for initiating operations controlled by this information.

Upon completion of scanning by the signal transfer unit, the sequence of operations hitherto described is reversed by a control system (not shown). The signal transfer unit is returned to its original position in readiness to undergo a new traverse, the clamp members 56a and 56b separate to release the information carrier 20 and the horizontal rack bar 50 is retracted fully to the right, as shown in Figure 1, so that the fork arms 55a and 55b once again clear the right-hand side of the carriers. Moreover, the vertical rack bar 39 is fully lowered to reference position, dropping the previously selected carrier 20 back into place, while the carriage 35 is retracted to the right to its start position. Thus the random access storage apparatus is restored to the condition where it is adapted to carry out a new reading cycle in response to a new set of received signals, A, B, C and D.

While the operation of the random access information storage apparatus has been described in terms of the reading of information previously stored upon an intelligence carrier, it will be appreciated that substantially the same series of operations in a cycle may be utilized to impress information upon a selected face portion of a carrier, the signal transfer unit in this case acting as a signal recording, rather than a signal reproducing, unit.

The features of the clamp-scan assemblies will now be considered in more detail. Since the clamp-scan assemblies carried by each fork arm are identical, with the exception that the directional disposition of the various components thereof are reciprocally reversed in the direction of stacking of the information carriers, it will be understood that the following description of one clamp-scan assembly applies in substantially the same manner to the other.

Figure 4:
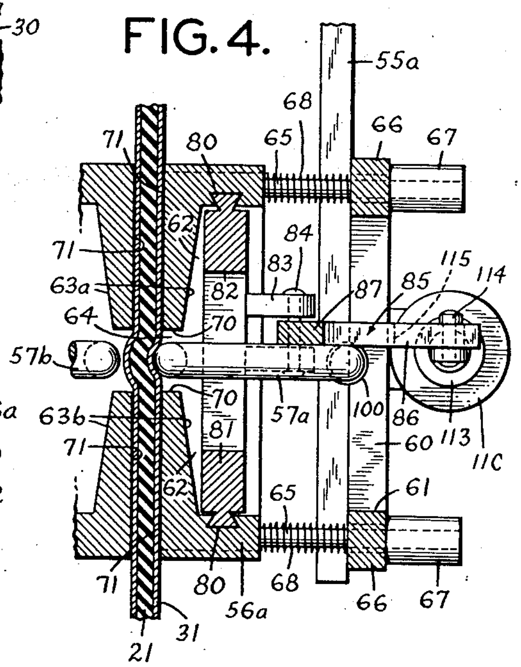
Figure 4 is a cross-sectional plan view of the clamp-scan assembly taken as indicated by the arrows 4—4 in Figure 3.

As shown in Figures 2, 3 and 4 which represent the situation where a carrier 20 is gripped between the clamps 56*a* and 56*b*, the fork arm 55*a* has attached thereto in a conventional manner a frame 60 of generally rectangular outline, in the upper half of which there is formed a large rectangular aperture 61 with its long dimension vertical. Spaced away from the frame 60 towards a carrier 20 (when contained by the fork arms) there is disposed the clamp 56*a*. The clamp 56*a* is rectangular in outline and has formed therein on the side away from the carrier 20 a shallow rectangular recess 62 (Fig. 4) with its long dimension vertical. The bottom of the recess 62 is formed by a pair of tapering shoulders 63 which extend towards each other to form therebetween a narrow vertical scanning slot 64 furnishing communication between the recess 62 and the side of clamp 56*a* towards the carrier 20.

The clamp 56*a* is supported in floating relation with respect to the frame as follows: Mounted on the four corners of the clamp 56*a* are four horizontal rods 65 extending towards the frame 60 and through four guide holes 66 in the same, to be connected to the four armatures (not shown) of four linearly acting solenoids 67 mounted on the frame 60. Ordinarily, these solenoids 67 are unenergized and the clamp 56*a* is drawn to the frame 60 by the urging of four helical tension springs 68 encircling the rods 65. During a reading cycle, however, when clamping of the carrier is to be effected, the four solenoids 67 are energized. Upon energization, each solenoid 67 causes the rod 65 associated therewith to move to the left against the bias of its encircling tension spring 68, causing the clamp 56 as a whole to be displaced away from the frame 60. Upon conclusion of the scanning stage of the reading cycle, the solenoids 67 are de-energized, with the result that the clamp 56*a* is once again drawn towards the frame 60 by the action of the tension springs 68.

As stated, when a particular reading cycle reaches the stage where clamping is to be effected, the two clamps 56*a* and 56*b* are positioned on opposite sides of the information carrier section 26 bearing the intelligence item to be read. When so positioned, the scanning slots 64 of the clamps are so proportioned that, before and during clamping, the margins 70 of the slots are coextensive with the edges of the selected information bearing section 25.

Associated in proximate relation with the slot margins 70, each carrier clamp 56 has, on its side confronting the carrier, a gripping face 71 defining a surface of the same configuration as the general configuration of its corresponding face portion 26*a* or 26*b*. For example, if, as shown in Figure 2, each section 25 of each information carrier 20 has planar face portions 26*a* and 26*b* the gripping faces 71 of both carrier clamps 56*a* and 56*b* will also define a plane surface. If, on the other hand, the sections 25 have face portions 26*a* and 26*b* defining other types of surfaces, the gripping faces will conform with these other type surfaces. In any case the gripping faces of the two clamps 56*a* and 56*b*, as between themselves, will be in spaced registry, and will be congruent in relation, which is to say that they are superposable, one on the other.

In view of the structure just described, it will be seen that when the solenoids 67 are energized, the edges of the section 26 bearing the intelligence item to be read will be yieldingly, but firmly, gripped between the faces of the two clamps 56. Moreover, if the information carrier 20 happens to deviate to some extent from its anticipated alignment, as, for example, in Figure 3, if the carrier 20 lies out of the vertical, since each solenoid 67 operates independently of the others to transmit a yieldable force to its clamp, the two clamps 56*a* and 56*b* in gripping the selected section, will accommodate themselves to the natural alignment of the section.

To scan the information on the face portions of clamped sections, a signal transfer head 57*a* is mounted on the clamp 56*a* as follows: Each of the two long vertical walls of the clamp recess 62 has formed therein a vertically extending dovetail guideway 80. The two guideways 80 are adapted to cooperate with a slide block 81 mounted therebetween for up and down movement in the recess 62. The slide block 81 has formed therein an aperture 82 providing access to the near face of a clamped information carrier.

Below this aperture 82 there is mounted on the slide block (on the side away from the carrier 20) a horizontally extending, clevis type of U-shaped bracket 83, the pin 84 of which supports an L-shaped bell crank lever 85 having a horizontal arm 86 extending through the aperture 61 of the frame 60, and a vertical arm 87 extending upwards to a point past the aperture 82 formed in the slide block.

The bell crank lever 85 is free to rotate around the bracket pin 84 within narrowly confined limits. In the clockwise direction, as seen in Figure 3, rotation of the lever 85 is restrained by a stop shoulder 90 which projects into the rotation path of the upper arm 87 from a rod 91 mounted on the slide block 81. For counterclockwise rotation, as seen in Figure 3, the lever 85 is restrained by a stop pin 92 also mounted on the slide block 81 above the aperture thereof, pin 92 being adapted to engage the vertical arm 87 of the bell crank lever 85. Ordinarily, the bell crank lever 85 is urged to its clockwise limit, as seen in Figure 3, by a helical compression spring 93, which encircles the stop pin 92.

The vertical arm 87 carries affixed thereto in a conventional manner the magnetic signal transfer head 57*a*. This head consists primarily of a toroidal yoke 95 composed of magnetically conductive material, the yoke 95 being disposed in a vertical plane at right angles to the plane of the slide block 81, and being contained in part within the aperture of the slide block. The toroidal yoke 95 forms, proximate the near face of the clamped information carrier 20, a V-shaped air-gap 96, increasing in taper from the outside to the inside of the yoke toroid. The top and bottom halves of the toroidal yoke 95 each terminate at the air-gap in a magnetic pole tip 97. The pole tips 97 of the magnetic head 57*a* are disposed to pass through the scanning slot 64 of the clamp 56*a*.

The magnetic signal transfer head 57*a* includes, as another component, a winding 100 encircling the yoke 95, the magnetic head 57*a* being adapted to convert electric signals passing through the winding 100 into stored information on the carrier 20 or, conversely, to convert scanned information stored on the carrier 20 into electric signals generated as an output of the winding 100.

The magnetic signal transfer head 57a is so disposed with respect to the vertical arm 87 of the bell crank lever 85 that when, as is the ordinary case, the arm 87 is urged clockwise by the compression spring 93, the outer surfaces of the pole tips 97 lie to the right of the plane defined by the gripping face 71 of the clamp 56a. Upon rotation of the bell crank lever 85 counterclockwise until stopped by stop pin 92, the outer surfaces of the pole tips 97 are sufficiently displaced to lie to the left of the plane defined by this gripping face.

As is well known to those familiar with the art, signal transference between the magentic head 57a and a face portion 26a of the information carrier 20 is accomplished by producing a relative movement or traverse between the head and face portion along a predetermined path, with the pole tips 97 of the head being maintained in close proximity with the face portion 26. If, during this traversing action, the random access apparatus is conditioned for recording, the face portion 26a scanned by the head initially is uniform as to magnetic properties. Electric signals to be recorded are applied to the winding 100 of the head to cause magnetic flux changes which correspondingly modify the magentic characteristic of the face portion to create information bearing indicia thereon as represented by the elements 105 in Figure 2.

For reproduction, rapid relative motion, as before, is produced between the head 57a and a face portion 26a along a predetermined path. In this case, the indicia 105 stored by the face portion 26 modify the magnetic flux of the head to induce in the winding 100 electric signals which are representative of the hitherto stored intelligence.

In the course of signal transference between the magnetic head 57a and a face portion 26a of an information carrier 20, intelligence transposition is accomplished, not by the flux in the direct air gap between the pole tips 97, but, rather, by the leakage flux which passes from one pole tip to link a short length of the carrier face and then returns to the other pole tip. As to this leakage flux, the density pattern thereof along the scanning path depends upon the size of the air gap between the pole tips and the carrier face. For example, with a very small air gap the leakage flux lines are concentrated at the pole tips proper to link a relatively short length of the carrier face along the scanning path. Conversely, with a large air gap the flux lines spread away from the vicinity of the pole tips to link a relatively extended length of the carrier face along the scaning path.

Maximum signal resolution on the carrier face (allowing the impression of the greatest number of indicia on the carrier face per unit length of scanning path) is achieved when, for the carrier face indicia, the length thereof (resulting from and/or required for effective linkage with the leakage flux) has been reduced as far as possible. Reduction of the nature stated is attained by increasing the leakage flux concentration at the pole tips. Accordingly, it is evident that the air gap between the pole tips and the carrier face should be as small as possible, the ultimate in optimum conditions obtaining when there is a direct engagement between the pole tips and the face portion of the carrier.

It has been found that a highly satisfactory mode of effecting such direct engagement is to render any face portion 26a locally yieldable under pressure, and to advance the magnetic head 57a into contact with the face portion so that the pole tips 97 of the head slightly and locally depress the contacted area of the face portion during scanning of the same. Thus, during scanning, the magnetic head 57a generates along the path of traverse a shallow trough in the face portion of the information carrier.

Local depression of the face portion as described is accomplished upon initiation of a scaning operation by rotating the bell crank lever 85 to its counterclockwise travel limit. As a result, the pole tips 97 of the magnetic head 57a are advanced sufficiently toward the carrier that the pole tip surfaces proximate thereto directly engage and slightly depress the face portion 26a contacted thereby.

Figure 5:
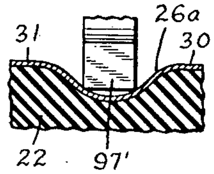
Figures 5 and 6 represent sectional views of the cooperation of an information storage member with conventional and improved signal transfer units, respectively.

To avoid the presence of an undesirable air gap between the head 57a and the carrier 20, it is necessary that the contour of the scanned face portion, where locally depressed by the pole tips, conforms to or hugs as closely as possible the contacting pole tip surface. In this regard the pole tips of conventional magnetic pick-up heads have been found to be unsatisfactory. Figure 5, for example, shows in transverse cross section a pole tip 97' having a conventional planar lower surface. Upon pressure engagement of this pole tip 97' with an information carrier face 26a, yieldable under pressure, the transverse cross sectional contour of the carrier face assumes, as shown, a concave configuration. As a result, direct contact between the pole tip 97' and the face 26a exists only along the edges of the planar pole tip surface. A limited region of contact of this sort furnishes an insufficiently large, low reluctance leakage flux path to produce effective signal transference between the pole tip 97' and the carrier face 26a.

Figure 6:
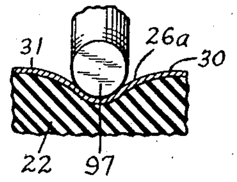

By way of contrast to conventional prior art pole tips, Figure 6 demonstrates the effectiveness of pole tips of the type presently disclosed. In Figure 6, the surface of the pole tip 97 proximate the carrier face 26a is convex in transverse contour. Accordingly, when the pole tip 97 is brought into pressure engagement with the face 26a to cause local depression of the same, the concave transverse contour of the locally depressed face 26a will conform closely to the convex transverse pole tip surface. By reason of the large, low reluctance contact area thus formed, the density of leakage flux may be maintained at a high value to produce efficient signal transference.

By virtue of the toroidal form of the yoke 95 the surfaces of the pole tips 97 on the outer side of the toroid and proximate the air gap 96 are convex in contour not only transversely, but also longitudinally (or in the direction of the air gap extension). From the foregoing discussion it will be apparent that these longitudinal convex contours of the pole tip surfaces also assist in maintaining close conformity between the contour of the locally depressed face portion and the pole tip surfaces.

As stated, the degree to which signal transference may be effected between the magnetic head 57a and the information carrier 20 is commensurate with the rate of change in the flux produced by the head. This rate of change of magnetic flux is, in turn, proportional to the speed of traverse of the magnetic head over the surface of the information carrier. For maximum effectiveness of signal transfer, therefore, as rapid a traversing speed as can be obtained is desirable. A device which initially rotates the bell crank lever 85 to cause, as described, the pole tips 97 of the magnetic head to locally depress the face portion 26, and which thereafter imparts the rapid desired translatory motion to the magnetic head, is furnished by a two-way, linearly acting fluid pressure motor. This motor may be, for example, as shown in Figure 2, a vertically oriented pneumatic cylinder 110 and piston 111 mounted on the lower half of the frame 60. The direction of piston movement is governed by a conventional, electromagnetically actuated valve 112. A vertical connecting rod 113 is coupled at one end to the piston 111, the other end of the rod 113 being coupled to the outer end of the bell crank horizontal arm 86 by a coupling pin 114 on the rod riding in a horizontal slot 115 in this arm.

When a particular reading cycle has reached the stage where a section 25 has been gripped between the two clamps 56a and 56b, the electromagnetic valve 112 on the side corresponding to this selected face portion is actuated to cause the piston 111 to move rapidly upward. As a first effect, this upward movement causes the bell crank lever 85 to rotate from its counterclockwise limit stop to its clockwise limit stop, the lever 85 accordingly advancing the magnetic head 57*a* towards the carrier 20 to cause the pole tips 97 to locally depress the face portion 26 to be read. When the bell crank lever 85 has reached its counterclockwise limit upon engaging stop pin 92, the upward drive of the piston is converted into upward translatory movement of the slide block 81. The magnetic head 57*a*, accordingly, will traverse the selected face portion 26*a* at a high speed, to cause signal transference to take place between its pole tips 97 and the face portion.

Upon completion of the information reading, the electromagnetic valve 112 will be actuated to give the piston 111 a downward movement. This downward movement initially rotates the bell crank lever 85 to its counterclockwise limit upon engaging stop shoulder 90. In so rotating, the lever 85 disengages the pole tips 97 from the face portion 26 just scanned. Thereafter, downward motion of the piston draws the slide block 81 downward to the starting position for another scanning operation. Upon restoration of the slide block 81 to its starting position, the electromagnetic valve 112 is rendered quiescent until its action is required for the next reading cycle.

The foregoing discussion has laid a foundation for considering the exact nature of the cooperative relations between an information carrier 20 having a face portion to be read, the clamps 56*a*, 56*b* and the magnetic heads 57*a*, 57*b*, respectively, associated therewith. Each one of clamp 56*a* and 56*b* has, as mentioned, a gripping face defining a surface matching that of the face portion which it confronts. For example, as shown in Figures 2 and 3, since the face portions 26 of the information carrier 20 are planar, the surface configuration defined by the gripping faces of the clamps will also be planar. As between each clamp and its associated signal transfer head, by virtue of the fact that the motion of the slide block 81 is constrained by guideways 80, the pole tips 97 trace out a predetermined path which bears a fixed spatial relation to the gripping face 71 of the clamp. Viewed as in Figure 2, this predetermined path traced out would appear as a straight line.

Viewed as in Figure 3, this predetermined path would be a line which follows in equidistant relation the contour, as seen in Figure 3, of the surface defined by the gripping face.

For example, since in Figure 3 the gripping face 71 defines a planar surface, the scanning path of the pole tips 97 will be a straight line parallel to this planar surface.

The equidistance relation described above exists whether, as is preferable, the pole tips during scan are adapted to locally depress the carrier face, or whether the apparatus is modified to provide during scan an air gap between the face and the pole tips. This equidistance relation also exists apart from the specific form taken by the face portion to be scanned and the matching surface defined by the gripping face 71. Hence, reduced to simplest terms, the primary cooperative relation established between an information carrier 20 a clamp 56*a* or 56*b* and a signal transfer heads 57*a* or 57*b* is that when a section of the carrier 20 is gripped by a clamp so that the surfaces defined by the section face and the gripping face are substantially one and the same, the pole tips of the head during scan will be maintained continuously equidistant from the carrier face. Stated in another way the predetermined path followed by the pole tips bears a relation of equidistance to the line on the face portion resulting from normal projection of the path upon the face portion. Where the pole tips during scan locally depress the face, the term "equidistant" is, of course, to be considered in terms of the distance of the pole tips when depressed from the surface defined by the carrier face before depression.

By virtue of this primary cooperative relation so established it is evident that all through the scan a uniform relative spacing will be maintained between the pole tips 97 and the face portion 26, thus avoiding signal error produced by casual changes in this spacing.

The use of clamps of the type described in conjunction with an information carrier and a moving signal transfer head has a number of other beneficial results as well. For example, in the absence of such clamps, a certain amount of casual sidewise relative motion from mechanical vibrations or the like inevitably arises between the carrier and the scanning magnetic head. Such casual relative motion causes error in both recording and reproduction of information. The use of clamps eliminates this source of error.

If, as mentioned, the carrier is out of alignment from an anticipated position, the use of clamps permits the accommodation of the pole tip scanning path to the actual alignment of the carrier. Moreover, if the information carrier used is to an extent flexible and thus collaterally subject in some degree to minor warpings and flexures, clamps of the type described will smooth out these carrier deviations to render the normal projection line of the scanning path upon the face portion to be scanned congruent in profile with the scanning path itself.

One other important function of the type of clamp described should be noted. In the absence of such clamps if the information carrier 20 utilizes a sheet of material which is resilient in the sense that it is stretchable in all directions in the plane of the face of the sheet, when the pole tips of the magnetic head 57*a* press against the sheet, stretching (with resulting deformation of the sheet) will occur throughout the whole face of the sheet, with the result that no well-defined local depression will be caused in the region of the pole tips. The clamps descirbed, however, in gripping the edges of the small section of the resilient sheet to be engaged, serve to isolate any stretching and deformation in that section from stretching and deformation throughout the rest of the sheet. In consequence, the contour of the local depression formed within the section will conform closely to the pole tip surfaces, permitting effective signal transference between one and the other.

Referring again to the information carriers adapted to be utilized with the random access information storage apparatus, it should be noted, as one important feature thereof that each carrier, as to its information storage faces, is continuous in extent.

The employment of such continuously extending storage faces overcomes a number of disadvantages inherently associated with the previously referred to prior art expedient of using a set of side by side ribbons stretched on a frame.

With the ribbon arrangement, to give proper tracking between the ribbons and the signal transfer head, the ribbon and frame assembly must be initially brought into and continuously maintained in exact alignment relation with the scanning path for the signal transfer head. Also, in this regard, all the ribbons must be kept in exact alignment with each other. Moreover, while each ribbon should be kept under approximately the same tension, the condition stated is difficult to attain since each ribbon strung under tension onto the frame affects the tension of previously strung ribbons. To keep the ribbons under proper tension requires a bulky frame. The ribbons themselves as individual elements are fragile by nature, thus being susceptible to breakage and not readily adaptable for firm contact with a signal transfer head. By contrast, a storage face of continuous areal extent has none of these infirmities.

While the random access signal storage apparatus as a whole is not necessarily confined to information carriers with planar faces, this feature in itself is of significant utility, in that a planar configration has the advantages of simplicity of construction and facility in locating information items on the face in terms of a plurality of coordinates.

The information carriers herein disclosed exhibit another highly useful feature, in that both sides of the same have faces adapted to store information. Thus, the disclosed information carriers, for a given transverse and longitudinal dimension, can store twice as many information items as a dimensionally similar prior art information storage medium which is adapted to carry signals on only one side thereof.

The advantages of an information carrier having a face locally yieldable under pressure, and the mechanics by which the pole tips of the magnetic head cause local depression of the carrier face have already, to some extent, been considered. Referring now to the structural features of the carrier by which this local yieldability to pressure may be obtained, first, as a result of the carrier construction, the material underlying the signal storage face of the carrier, although not to a significant extent stretchable in the face extension, may be locally compressible, as shown in Figure 6, in regions of pressure applied perpendicularly to the carrier face. Conversely, although, as a result of the carrier construction, the material underlying the face may not be significantly compressible responsive to normal pressure, this material may be, as shown in Figure 4, resiliently stretchable in the face extension. Under these conditions, also, the face will be locally yieldable to pressure in regions of application thereof. With regard to pressure yieldability obtained in this latter manner, as previously mentioned, particularly desirable results are obtained when the resilient stretching which occurs is local in nature rather than being manifested throughout the entire face of the carrier.

Of course, local pressure yieldability of the carrier face may also be obtained by a combination of both resilient stretching in the face extension and resilient compression of the material underlying the face.

Figure 7:
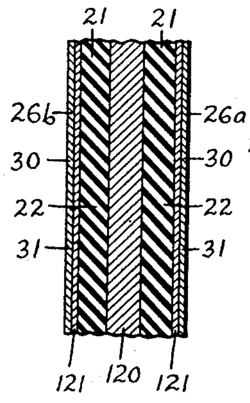
Figures 7, 8, 9, 10 and 11 represent cross-sectional fragmentary views of various types of information storage members adapted for use with the apparatus shown in Figure 1.
Figure 8:
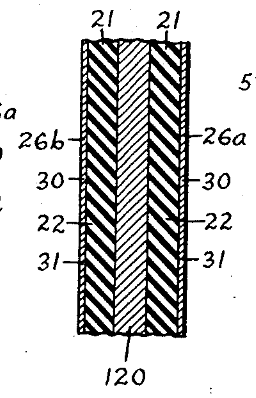
Figure 9:
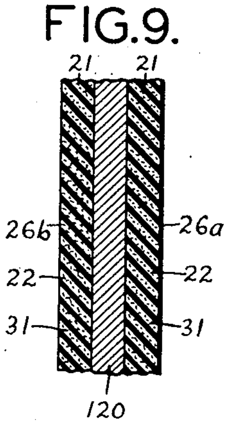

Referring now to Figures 7, 8, 9, 10 and 11, which represent cross sectional views of specific useful carrier constructions, in Figures 7, 8 and 9 the configurations of the carriers shown are maintained in desired planar form by a central stiffening sheet 120 composed of metal or material having similar qualities. The employment of stiffening sheets permits elimination of the edge-supporting frames 23 (Fig. 1) for the information carriers 20. As a result the carriers 20 may be more closely stacked together.

In each of the constructions of Figures 7, 8 and 9, to both sides of the stiffening sheet there are bonded additional sheets 21 composed primarily of a rubber-like material 22, as, for example, neoprene. A quantity of electomagnetic signal sensitive material 31, as, for example, iron oxide, is associated with each resilient sheet 21, the signal sensitive material 31 being so disposed that the outer faces of the carrier are adapted to act as signal storage areas.

In Figure 7, to the two outer faces of the resilient sheets 21 there are bonded, respectively, two thin flexible metal sheets 121 adapted to yield under pressure conformable with the yielding of the resilient sheets 21. In the structure shown, the electromagnetic sensitive material 31 is dispersed in two layers 30 adhering to the two respective outer faces of these two flexible sheets. The outer surfaces of the two layers 30 form respectively two electromagnetic signal sensitive faces having respectively face portions *26a* and *26b*.

For the structure of Figure 8, the electromagnetic signal sensitive material 31 is dispersed in two layers 30 which are deposited directly upon the two outer faces of the resilient sheets 21. In the construction of Figure 9, the electromagnetic signal sensitive material 31 is distributed throughout the body of the resilient sheet 21 in interspersed relation with the rubber-like material 22 primarily composing the same. Thus, in the carrier of Figure 9, the sheet comprising material itself acts as the seat of information signal storage.

It will be appreciated that in certain application it may be desirable to modify the constructions of Figures 7, 8 and 9 so that only one resilient sheet 21, and accordingly only one signal storage face *26a* or *26b* is associated with each stiffening sheet 120. Furthermore, in certain applications it may be desirable that the stiffening sheet 120 be quasi-flexible or flexible in nature.

Figure 10:
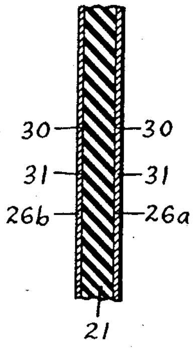
Figure 11:
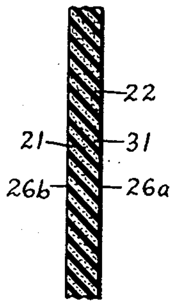

The information carrier construction shown in Figures 10 and 11 differ from those of Figures 7, 8 and 9, in that no stiffening sheet 120 is utilized. In both Figures 10 and 11, the primary member of the information carrier is a single sheet 21 composed of resilient material 22, such as neoprene. In the Figure 10 construction, the electromagnetic signal sensitive material 31 is dispersed in two layers 30 adhering to opposite sides of the resilient sheet 21 to form two signal storage faces having respective face portions *26a* and *26b*. The construction of Figure 11 also has two signal storage faces. In Figure 11, however, the electromagnetic signal sensitive material 31 is distributed throughout the body of the sheet in interspersed relation with the rubber-like material 22 primarily composing the sheet, so that (as in the case of Figure 9) the comprising material of the sheet 21 itself acts as a seat for signal storage.

With the constructions of Figures 10 and 11, it has been found preferable to use, as shown in Figure 1, a rectangular frame 23 for edge supporting the margins of the resilient sheet 21 to prevent undue buckling, or other distortion to the desired planar configuration of the same.

The embodiments of the various inventions shown in the drawings and described herein are, obviously, susceptible of considerable modification in form and detail within the spirit of the inventions involved. These embodiments, therefore, are to be recorded as illustrative only, and not as limiting of the scope of the following claims.

We claim:

1. A planar sheet of resilient material having a face which is yieldable under pressure in regions of application thereof, and which is resiliently stretchable in all directions in the plane of said sheet, a quantity of electromagnetic signal sensitive material carried by said sheet and forming a signal storage region adapted to cooperate with signal transfer devices in closely disposed relation with said face, and frame means for edge supporting the sheet to assure a planar configuration for the face thereof.

2. Signal memory apparatus comprising, a stack of signal storage members each having at least one lengthwise extended portion adapted to store a lengthwise distribution of electromagnetic signals, a signal transfer head adapted by lengthwise movement thereof relative to said portion to traverse said portion to cause electromagnetic transference of a signal distribution between said portion and head, guide means to constrain the movement of said head to a predetermined path relative to said guide means, means providing an abutment surface which is positionally fixed in relation to said path, selector means to render any selected one of said storage members in contiguous relation with said abutment surface, and yieldable means adapted by pressing said selected member against said abutment surface to align said portion of said member with said path and to preclude casual movement of said portion relative to said path.

3. Signal memory apparatus comprising, a thin member of areal extent having on at least one side at least one section with a localized face portion area, said face portion being adapted to store electromagnetic signals, first clamp means having an aperture with margins adapted to encompass substantially no more than said face portion area and having a surface contiguous with said margins, said surface confronting said one side of said member, second clamp means having a surface portion disposed on the other side of said member in superposable relation with the surface of said first clamp means, means for causing said member to be intermittently gripped between said surfaces of said two clamp means with concurrent encompassment of said face area by the margins of said aperture, and a signal transfer head operative subsequent to said gripping of said member to cause electromagnetic signal transference through said aperture between said head and said portion.

4. Signal memory apparatus comprising, a thin member of areal extent having on one side a continuous planar face and on the other side a parallel face, said member being geometrically subdivisible into a plurality of sections having face portions on said continuous face, each of said plurality of face portions being adapted to store electromagnetic signals over at least a part of the area thereof, first clamp means having an aperture with margins adapted to encompass substantially no more than the area of any selected face portion and having a planar surface contiguous with said aperture margins, said surface confronting said continuous face, second clamp having a planar surface portion disposed to confront said parallel face in superposable relation with the surface of said first clamp means, means for causing said member to be intermittently gripped between the surfaces of said two clamp means with concurrent encompassment by said aperture margins of the surface area of a selected portion, and a signal transfer head operable subsequent to said gripping of said member to cause electromagnetic signal transference through said aperture between said head and the selected portion.

5. An assembly adapted by traverse of at least a part of the face of a signal storage device to cause electromagnetic signal transference with the part traversed, said assembly comprising, a clamp member having an aperture and a surface contiguous with said aperture, said surface being adapted to confront the face of said device, a signal transfer head adapted to traverse said face, constraining means cooperative with both said clamp member and said head to guide said head along a predetermined path with respect to said clamp member, support means for carrying in floating relation said clamp member between itself and said device, means for urging said clamp member away from said support means for engagement of said clamp member surface with said face, and means for thereafter driving said head through said predetermined path for traverse of said head over said face.

6. Signal memory apparatus comprising, a stationary, flexible lengthwise extended signal storage element having front and back sides each yieldable under pressure applied to a portion thereof and each adapted to store separate electromagnetic signal groups, means to hold in place the lengthwise separated ends of said element when said portion of said element has pressure applied thereto, a pair of signal transfer heads disposed on opposite sides of said element in a common lengthwise extended plane which passes through said element normal to said front and back sides thereof, said heads each being adapted to cooperate with a separate side of said element, and means for selectively causing one at a time of said signal transfer heads to traverse its corresponding side in a lengthwise direction and under pressure engagement therewith to thereby produce electromagnetic signal transference between said traversing signal transfer means and the portion of the face engaged in traverse.

7. Signal memory apparatus comprising, a signal storage member having front and back continuous faces of areal extent each adapted to store separate electromagnetic signal groups in different face portions thereof, a pair of signal transfer means each adapted to cooperate with a separate face, means for selectively causing one of said signal transfer means to traverse its corresponding face to thereby produce electromagnetic signal transference between said traversing signal transfer means and its corresponding face, and a pair of clamp members each mounting one of said signal transfer means for relative movement therewith to produce by said movement said traverse over the corresponding face of said signal storage member, said clamp being adapted to be actuated before each traverse to clamp said signal storage member between said two clamp members to thereby preclude casual relative movement between said signal storage member and either one of said signal transfer means.

8. Signal memory apparatus comprising, a resilient sheet member having a face of continuous areal extent adapted by resilient stretching of said member in all directions in the plane of the face to be depressible under pressure applied to a portion of said face, said face being also adapted to store separate electromagnetic signal groups in different portions thereof, a signal transfer means, means for causing said signal transfer means to traverse said face under pressure engagement therewith to thereby produce electromagnetic signal transference between said signal transfer means and the portion of the face engaged in traverse, and means for clamping the margins of a localized area surrounding the portion of the face traversed by said signal transfer means to thereby confine the stretching of said member under said pressure engagement to within said localized area.

References Cited in the file of this patent

UNITED STATES PATENTS

| | | |
|---|---|---|
| 2,195,192 | Schuller | Mar. 26, 1940 |
| 2,581,765 | Mann | Jan. 8, 1952 |
| 2,603,006 | MacChesney | July 15, 1952 |
| 2,620,389 | Potter | Dec. 2, 1952 |
| 2,650,830 | Potter | Sept. 1, 1953 |
| 2,668,718 | Roberts | Feb. 9, 1954 |
| 2,672,346 | Roberts | Mar. 16, 1954 |

FOREIGN PATENTS

| | | |
|---|---|---|
| 651,016 | Great Britain | Mar. 7, 1951 |
| 657,494 | Great Britain | Sept. 19, 1951 |